Figures 1, 2:
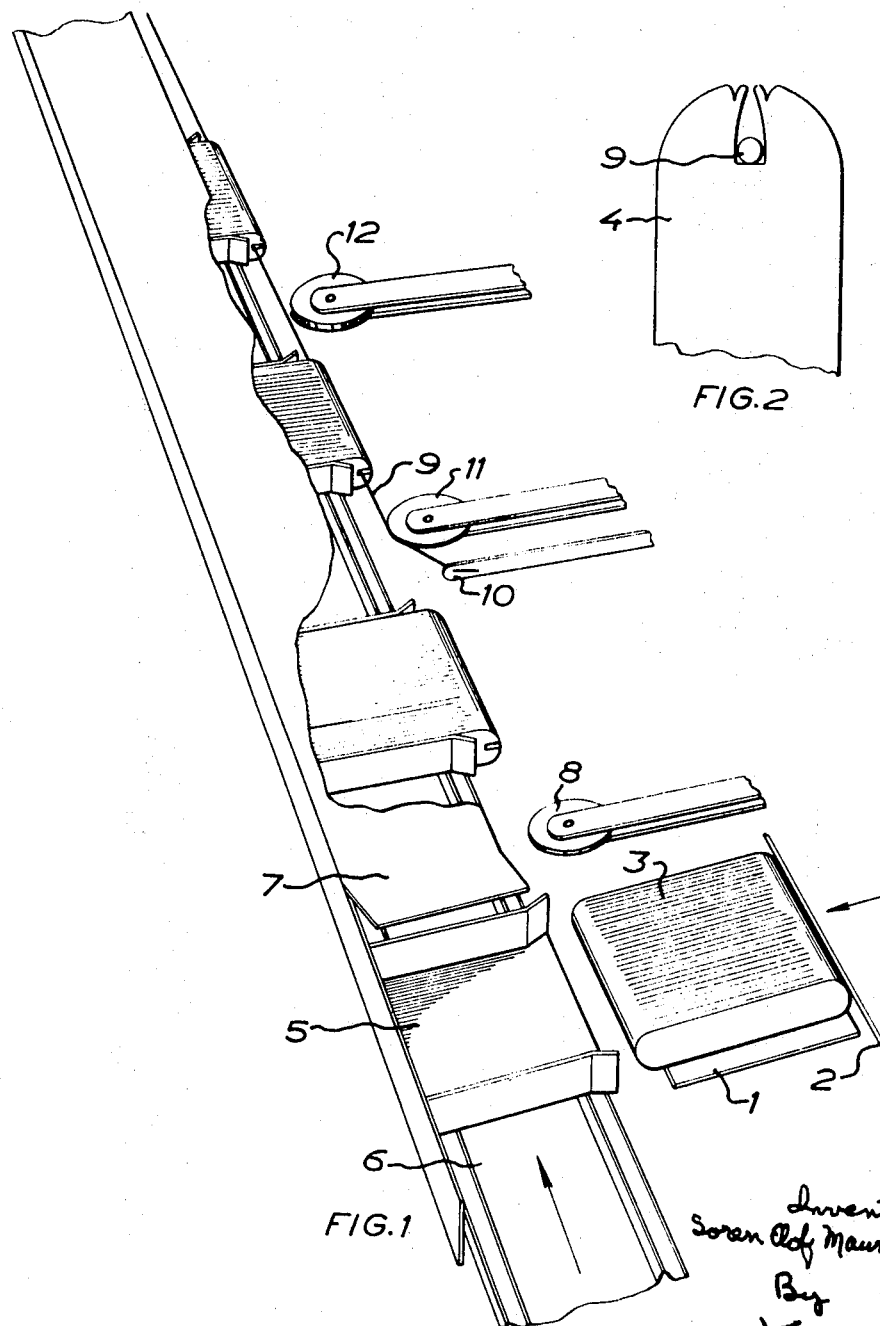

United States Patent

[11] 3,591,998

| [72] | Inventor | Soren Elof Mauritz Sollerud<br>Norrkoping, Sweden |
|---|---|---|
| [21] | Appl. No. | 860,365 |
| [22] | Filed | Sept. 23, 1969 |
| [45] | Patented | July 13, 1971 |
| [73] | Assignee | Goran Gustaf Eriksson<br>Brabogarden Jursla, Aby, Sweden |
| [32] | Priority | Sept. 26, 1968 |
| [33] | | Sweden |
| [31] | | 12959/68 |

[54] METHODS AND APPARATUS FOR SECURING TOGETHER STICKS IN BUNDLES
7 Claims, 2 Drawing Figs.

[52] U.S. Cl. .................................................53/3, 53/23, 53/123, 53/197
[51] Int. Cl. ........................................................ B65b 15/00
[50] Field of Search............................................ 206/56 A; 53/3, 196, 23, 123, 200, 197; 221/312, 312 A; 29/509, 515, 241, 433

[56] References Cited
UNITED STATES PATENTS
1,296,402  3/1919  Kahn .............................. 29/515
FOREIGN PATENTS
130,509  1/1951  Sweden ........................ 53/197

*Primary Examiner*—Theron E. Condon
*Assistant Examiner*—Neil Abrams
*Attorney*—Karl W. Flocks ABSTRACT: A method and an apparatus by which sticks are secured together in bundles with the aid of a string which is placed in a recess formed in the stick ends. After the string has been placed in the recess the stick ends are deformed adjacent the recess to anchor the string therein. A continuous string can be used, whereby the bundles are mutually connected to each other.

PATENTED JUL 13 1971

3,591,998

Inventor:
Soren Olof Mauritz Sollerud
By
Kvan W. Frocks
Attorney

METHODS AND APPARATUS FOR SECURING TOGETHER STICKS IN BUNDLES

This invention relates to a method of securing together sticks in bundles, and more particularly sticks which are to be partially embedded or frozen into ice cream.

At present the following methods are utilized in handling sticks that shall be partly embedded or frozen into ice cream, frozen fruit juices or the like. The older most general method comprises manual or mechanical production of tied bundles of about 50 sticks, which bundles are cut open when charged manually into the magazine of a stick-consuming machine. In a more recent method use is made of cassettes which are charged with oriented sticks and which are meant to maintain the orientation of the sticks during the transport to the magazine of a stick-consuming machine where the cassette is opened, the intention being for the cassette to empty itself automatically with retained orientation of the sticks.

In addition to being expensive, the first-mentioned method implies that certain care must be observed in handling the tied-together sticks since the retention thereof is weak because of the polished nature of the sticks. In the last-mentioned method which necessitates less labor for charging the sticks into the magazine of the stick-consuming machine one has to use—for a satisfactory operation of the method—expensive single-use packages in the form of single-use cassettes, use-cassettes, or multiple-use cassettes of a material having a sufficiently long life. However, it is unavoidable that the orientation of the sticks is disturbed during transport with resulting operational trouble, for which reason the economically advantageous result is jeopardized particularly with regard to the expensive and relatively complicated apparatus required for handling the sticks and transporting them from the cassette to the site of the stick-consuming machine.

The present invention has for its object to provide a method of securing together sticks, and more particularly such sticks as shall be used as ice cream sticks, to facilitate the handling thereof. To this end, the sticks are oriented and placed in juxtaposition in a holder or cassette, a recess or hole is made in the one ends of the sticks, a string is placed in the recesses or holes in the stick ends, and the stick ends close to the string are subjected to deformation for jamming the string in said recesses or holes. By securing together sticks and stick bundles in this way with the aid of a string or like means the string with the sticks secured thereto can be conveyed into a transport container, and after said container has been filled the string can be cut off and the string end secured to the container so that the string end can be readily and rapidly located at the place of consumption and connected to the feed mechanism of the stick-consuming machine, or the string end can be tied to the trailing free end of a stick string already connected to such feed mechanism. Prior art machines supplied with tied stick bundles can be fed with sticks arranged in accordance with the invention, in which case the stick string is preferably cut so that a suitable number of sticks is obtained for loading the magazine.

The invention also relates to an apparatus for carrying out the above-described method, and said apparatus is characterized by at least one cassette which is movable stepwise in a path and in which a plurality of sticks oriented in the same direction can be placed in juxtaposition with their one ends projecting from the cassette, a milling tool for forming a recess in the projecting stick ends, means for mounting a string in the recess formed in the stick ends, and a device for deforming the stick ends after the string has been placed in the recess.

The expression "string" as used herein is meant to cover strings of any conceivable material, for example synthetic plastics and wire material of any kind.

The invention will be more fully described in the following, reference being had to the accompanying drawing which diagrammatically illustrates a method for practicing the invention.

In the drawing:

FIG. 1 shows an arrangement for placing sticks on a string;
FIG. 2 shows an individual stick attached to a string.

A path designated 1 in FIG. 1 and connected to a sorting device (not shown) for sticks 4 has a feed mechanism 2 for feeding sticks 4 in the form of bundles. The path 1 is arranged at right angles to a stepwise movable conveyor 6 which has cassettes 5 adapted to receive the stick bundles. An angularly bent guide plate 7 having an upper portion, a lateral portion and an upwardly bent end is so placed that the cassettes 5 can be moved in beneath it with the underside of the upper portion of the plate bearing against the upper sides of the cassettes 5 and with the lateral portion of the plate bearing against the sides of the cassettes facing away from the feed end. A milling blade 8 of a thickness considerably smaller than the width of the sticks is placed at a distance of half a cassette pitch from the path 1 as viewed in the direction of motion of the cassette conveyor 6 and in a plane situated midway between the underside of the upper portion of the guide plate 7 and the bottoms of the cassettes 5 and spaced from the lateral portion of the guide plate 7 to the periphery of the milling blade a distance which is smaller than the length of a stick 4. A wire 9 having a diameter equal to or slightly deviating from the width of the milling blade is conducted from a braked supply spool (not shown) through a string guide 10 to a guide wheel 11 which has a width slightly smaller than that of the milling blade 8 and a groove of arcuate cross section extending along the peripheral surface. The guide wheel 11 is placed a distance of one cassette pitch from the milling blade 8 as viewed in the direction of motion of the cassette conveyor but in the same plane as the milling blade 8, and the lateral portion of the guide plate 7 and the outer periphery of the guide wheel are spaced apart a distance which is smaller by half the string diameter than the distance between the milling blade 8 and the lateral portion of the guide plate 7. Disposed at a distance of one cassette pitch from the guide wheel 11 as viewed in the direction of motion of the cassette conveyor is a pressure roller 12 which has a groove of arcuate cross section extending along its peripheral surface, the width of said pressure roller 12 being considerably larger than that of the milling blade 8 but smaller than that of the stick 4. The distance between the lateral portion of the guide plate 7 and the bottom of the groove of the roller 12 is equal to the length of the stick 4.

The apparatus operates as follows: A bundle of sticks 3 is advanced in the path 1 by the feed mechanism 2 and is placed in a stationary cassette 5, whereupon the cassette conveyor 6 is moved one cassette pitch, the milling blade 8 milling a slot in the bundle of sticks 3. When after the filling of the next following cassette the first cassette is advanced a further cassette pitch the guide wheel 11 will introduce the string 9 into the slot whereupon the pressure roller at the next step of the cassette conveyor closes the slot opening in the bundle of sticks 3 by exerting pressure against the stick ends facing the roller. Each stick will thus have the shape shown in FIG. 2. After that the bundle of sticks is ejected from the cassette and collected in a transport container. The sticks are kept together in this way in bundles which are kept together in turn. With the aid of the string the sticks can be conveyed to the desired location and be freed from it there.

Other embodiments of the invention are conceivable without departing from the actual idea of invention. Thus a hole can be formed in the stick, through which a string is passed. The invention is not therefore restricted to the embodiment described above and illustrated in the drawing but can be modified within the scope of the appended claims.

We claim:

1. A method of securing together sticks in bundles comprising the steps of orienting the sticks and arranging them in juxtaposition in a holder, holding said sticks in juxtaposition in said holder and forming a recess in the one ends of the sticks, placing a string in the recess in the stick ends, and deforming the stick ends adjacent the recess therein to anchor the string in said recess.

2. A method of securing together sticks in bundles comprising the steps of orienting the sticks and arranging them in juxtaposition in successive holders on a conveyor belt, forming a recess in the one ends of the sticks, placing a continuous string in the recess in the ends of the sticks in successive holders, deforming the stick ends adjacent the recess therein to anchor the string in said recess, and removing the bundles of sticks from the holders, the bundles being kept together and mutually connected by means of the continuous string.

3. An apparatus for securing together sticks in bundles comprising means for arranging the sticks oriented and in juxtaposition in holders, a cutting mechanism, said holders being adapted to hold sticks in juxtaposition therein in bundles, said holders and said cutting mechanism being movable in relation to one another for providing a recess in the stick ends by means of the cutting mechanism, means for placing a string in the recess in the stick ends, and means for deforming the stick ends adjacent the recess therein to anchor the string in said recess.

4. An apparatus for securing together sticks in bundles comprising means for arranging the sticks oriented and in juxtaposition in successive holders, a cutting mechanism, said holders and said cutting mechanism being movable in relation to one another for providing a recess in the stick ends by means of the cutting mechanism, means for placing a continuous string in the recess in the ends of the sticks in the successive holders, and means for deforming the stick ends adjacent the recess therein to anchor the string in said recess.

5. An apparatus for securing together sticks in bundles comprising means for arranging the sticks oriented and in juxtaposition in holders which are movable in sequence in a path by means of a conveyor, a cutting mechanism disposed adjacent the path of motion of the holders for providing a recess in the stick ends as the sticks go past the cutting mechanism, means for placing a string in the recess in the stick ends, and means for deforming the stick ends adjacent the recess therein to anchor the string in said recess.

6. An apparatus as claimed in claim 5, wherein said means for placing the string in the recess is a pulley which has a groove in its periphery for guiding the string into the recess.

7. An apparatus as claimed in claim 5, wherein said means for deforming the stick ends is a roller having a groove of arcuate shape in radial section, which groove is adapted to be placed over the recess in the stick ends so that the walls defining the recess are pressed into the stick ends.